(12) United States Patent
Whitefield, II

(10) Patent No.: US 8,706,443 B2
(45) Date of Patent: Apr. 22, 2014

(54) SYSTEM AND METHOD FOR MONITORING ROTATING DEVICE

(75) Inventor: Charles David Whitefield, II, Carson City, NV (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 13/165,537

(22) Filed: Jun. 21, 2011

(65) Prior Publication Data
US 2012/0330604 A1    Dec. 27, 2012

(51) Int. Cl.
*G06F 15/00*    (2006.01)
*G01B 7/004*    (2006.01)

(52) U.S. Cl.
CPC ..................... *G01B 7/004* (2013.01)
USPC ........................................ 702/151

(58) Field of Classification Search
CPC ....................................... G01B 7/004
USPC .......................................... 702/151
See application file for complete search history.

(56) References Cited

U.S. PATENT DOCUMENTS

| | | | |
|---|---|---|---|
| 4,307,393 A | 12/1981 | Hamada et al. | |
| 4,847,785 A | 7/1989 | Stephens | |
| 5,347,289 A * | 9/1994 | Elhardt | 342/448 |
| 5,365,254 A | 11/1994 | Kawamoto | |
| 6,421,571 B1 | 7/2002 | Spriggs et al. | |
| 6,668,253 B1 | 12/2003 | Thompson et al. | |
| 6,775,576 B2 | 8/2004 | Spriggs et al. | |
| 7,420,562 B2 | 9/2008 | Shinohara et al. | |
| 7,511,711 B2 * | 3/2009 | Ing et al. | 345/424 |
| 7,606,673 B2 | 10/2009 | Judd | |
| 7,606,681 B2 | 10/2009 | Esmaili et al. | |
| 2007/0109301 A1 | 5/2007 | Smith | |
| 2011/0125461 A1 | 5/2011 | Smith et al. | |
| 2012/0330605 A1 * | 12/2012 | Whitefield, II | 702/151 |
| 2012/0330606 A1 * | 12/2012 | Whitefield, II | 702/151 |

FOREIGN PATENT DOCUMENTS

| | | |
|---|---|---|
| DE | 3044440 A1 | 6/1982 |
| DE | 4317401 A1 | 12/1994 |
| JP | 2010266329 A | 11/2010 |

OTHER PUBLICATIONS

Danish Patent and Trademark Office Search Report from TK Application No. 201270349 dated Jan. 28, 2013.

* cited by examiner

*Primary Examiner* — Bryan Bui
(74) *Attorney, Agent, or Firm* — Fletcher Yoder, P.C.

(57) ABSTRACT

A system for use in monitoring operation of a rotating device is described herein. The system includes at least one sensor, an input device, a display device, and a processor. The sensor is configured to sense a position of a component coupled to the rotating device, and to generate a signal indicative of the position of the component with respect to a reference. The input device is configured to generate a signal indicative of a user selection input. The processor is coupled in communication with the sensor, the input device, and the display device, and is programmed to calculate a plurality of timebased position values associated with a relative position of the component with respect to a predefined period of time. A plurality of orbital position values associated with a relative position of the component are calculated by the processor. The processor graphically presents at least one of a plurality of timebased traces corresponding to the calculated plurality of timebased position values and a plurality of orbit traces corresponding to the calculated plurality of orbital position values in response to a user selection input via said input device.

23 Claims, 5 Drawing Sheets

SYSTEM AND METHOD FOR MONITORING ROTATING DEVICE

BACKGROUND OF THE INVENTION

The subject matter disclosed herein relates generally to monitoring systems and, more specifically, to systems and methods for use in monitoring the operation of a rotating device.

Known machines may exhibit vibrations or other behavior during operation. Sensors may be used to measure such behavior and to determine, for example, an amount of vibration exhibited in a motor drive shaft, a rotational position of a shaft, and/or other suitable operational characteristics of a machine or motor. Often, the sensors are coupled to a monitoring system that includes a plurality of monitors and at least one processor. The monitoring system receives signals that are representative of measurements sensed from the sensors, and transmits those measurements to a diagnostic platform that displays the measurements in a form usable by a user.

However, at least some known diagnostic platforms may have limited space available to display measurements received from sensors. Accordingly, at any one time, known diagnostic systems may only be able to display a subset of desired measurement data to a technician or to a user. As such, the technician or user may not be able to easily and/or quickly diagnose operational faults and/or errors within a machine. The difficulty associated with, and/or the delay, in diagnosing faults and/or errors may result in damage occurring to the machine and/or may undesirably result in the machine becoming unusable for a period of time.

BRIEF DESCRIPTION OF THE INVENTION

In one aspect, a system for use in monitoring operation of a rotating device is provided. The system includes at least one sensor, an input device, a display device, and a processor. The sensor is configured to sense a position of a component coupled to the rotating device, and to generate a signal indicative of the position of the component with respect to a reference. The input device is configured to generate a signal indicative of a user selection input. The processor is coupled in communication with the sensor, the input device, and the display device, and is programmed to calculate a plurality of timebased position values associated with a relative position of the component with respect to a predefined period of time. A plurality of orbital position values associated with a relative position of the component are calculated by the processor. The processor graphically presents at least one of a plurality of timebased traces corresponding to the calculated plurality of timebased position values and a plurality of orbit traces corresponding to the calculated plurality of orbital position values in response to a user selection input via said input device.

In another aspect, one or more computer-readable storage media having computer executable instructions embodied thereon, wherein when executed by at least one processor, the computer-executable instructions cause the at least one processor to receive a signal indicative of a position of a component coupled to a rotating device with respect to a reference. The processor also calculates a plurality of timebased position values associated with a relative position of the component with respect to a predefined period of time. A plurality of orbital position values associated with a relative position of the component is calculated by the processor. The processor graphically present at least one of a plurality of timebased traces corresponding to the calculated plurality of timebased position values and a plurality of orbit traces corresponding to the calculated plurality of orbital position values in response to a user selection input via said input device.

In yet another aspect, a method of monitoring the operation of a rotating device is provided. The method includes transmitting, from at least one sensor, one or more signals indicative of a relative position of a component coupled to the rotating device with respect to a reference. The computing device calculates a plurality of timebased position values associated with a relative position of the component with respect to a predefined period of time. A plurality of orbital position values including a position of the component within the reference plane is calculated by the computing device. The computing device presents at least one of a plurality of timebased traces corresponding to the calculated timebased position values and a plurality of orbit traces corresponding to the calculated orbital position values.

DETAILED DESCRIPTION OF THE INVENTION

The exemplary methods and systems described herein overcome at least some disadvantages of at least some known diagnostic platforms by providing a monitoring system that simultaneously displays a plurality of traces corresponding to a sensed vibration of a rotating component within a reference plane. Moreover, the embodiments described herein include a computing device that graphically presents a plurality of traces corresponding to the sensed vibration amplitude of the component, and enables a user to adjust a size and shape of the traces by selecting from a plurality of measurement scale factors. By displaying a plurality of traces that correspond to a vibration amplitude of a rotating component, the monitoring system described herein, enables a user to quickly and efficiently identify undesired vibration amplitudes as compared to known diagnosis systems. As a result, the operating efficiency of the rotating component is facilitated to be increased.

Figure 1:
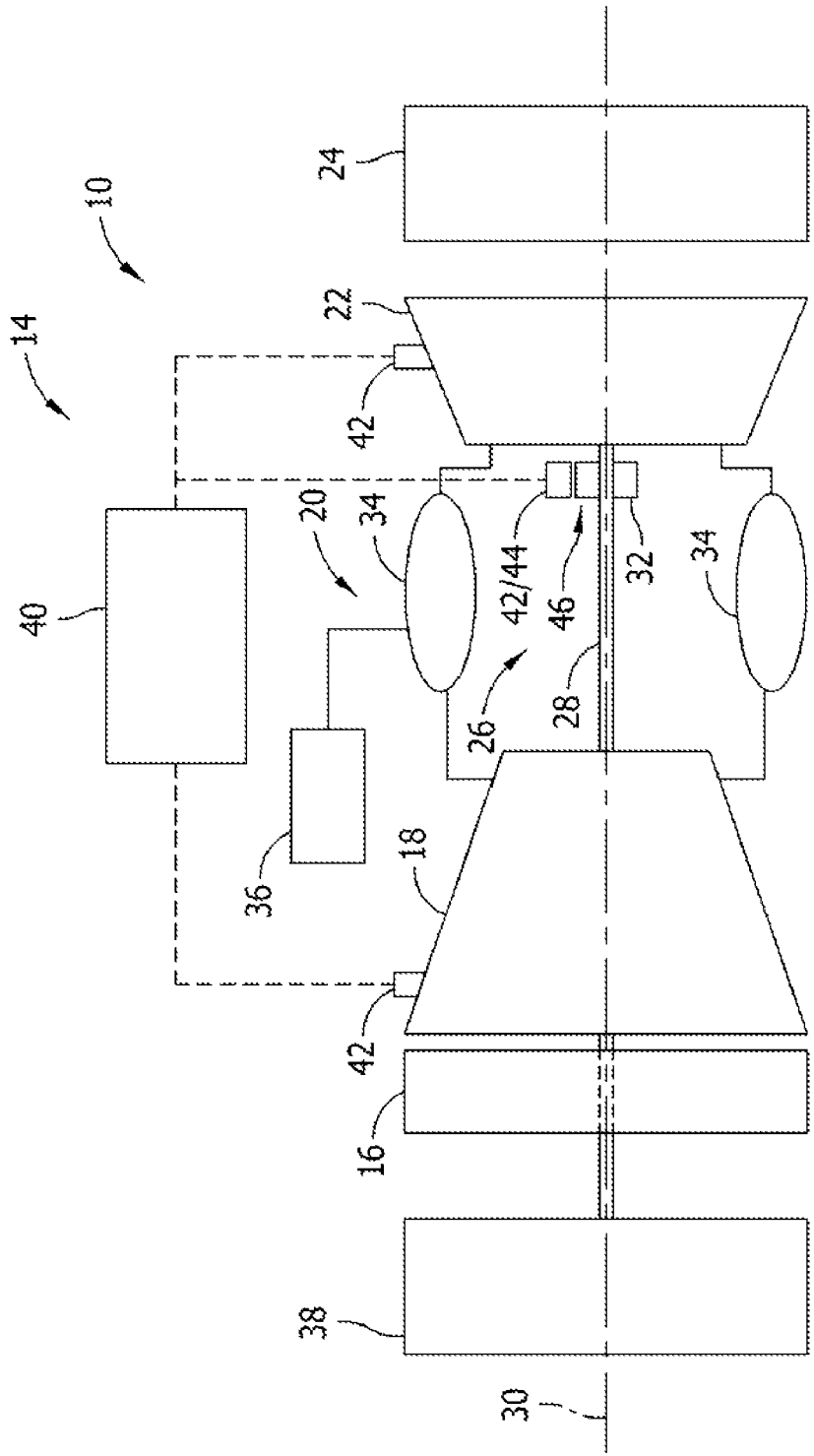
FIG. 1 is a schematic illustration of an exemplary rotating device.
Figure 2:
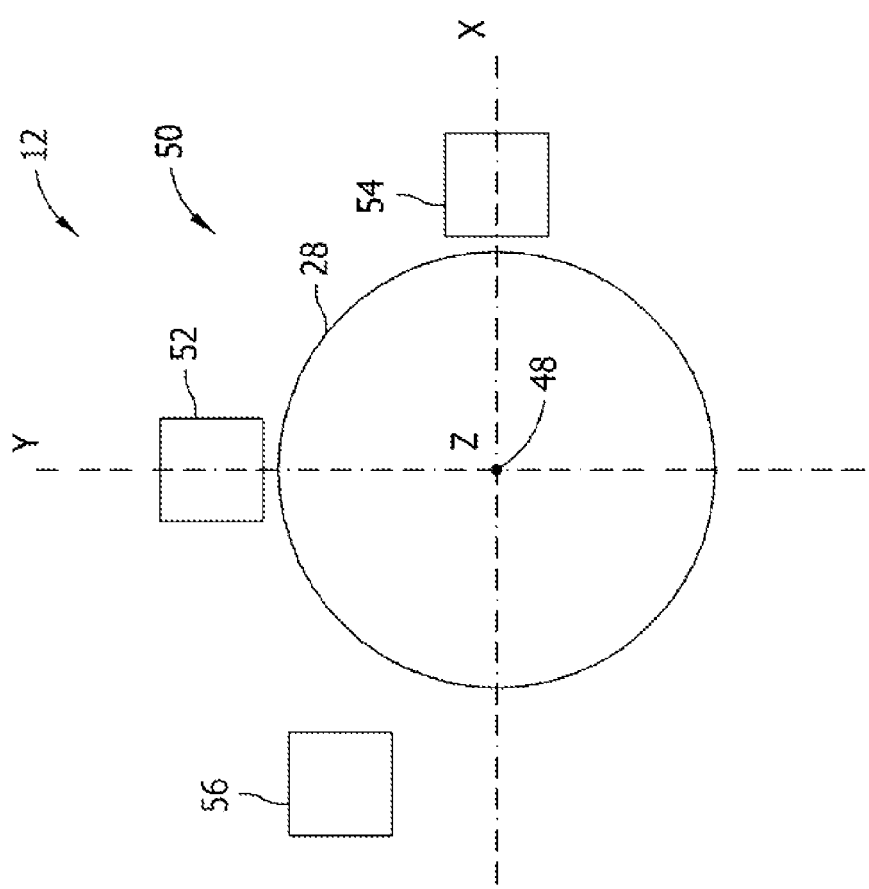
FIG. 2 is a cross-sectional view of an exemplary component that may be used with the rotating device shown in FIG. 1.
Figure 3:
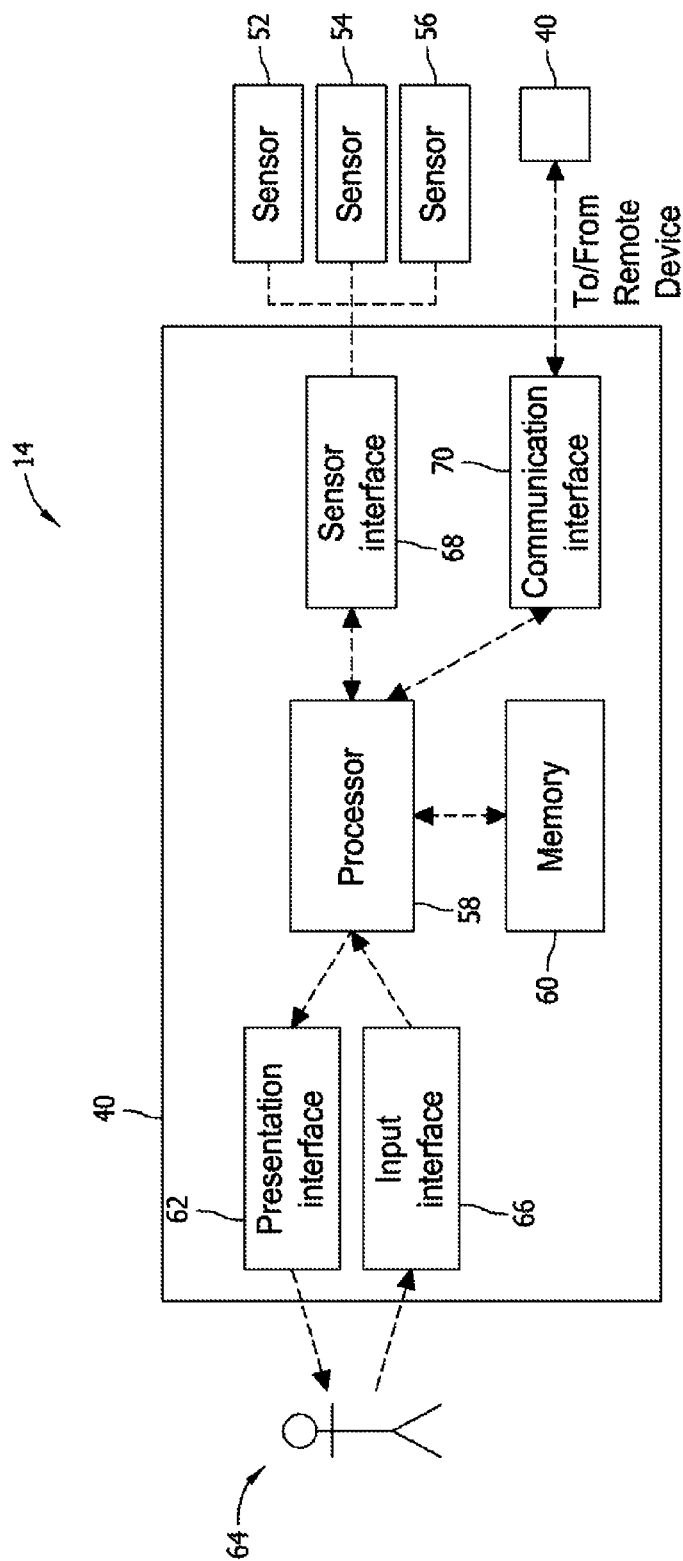
FIG. 3 is a block diagram of an exemplary monitoring system that may be used to monitor the rotating device shown in FIG. 1.

FIG. 1 is a schematic view of an exemplary rotating device 10. FIG. 2 is a cross-section of an exemplary rotating component 12 that may be used with rotating device 10. It is desirable to known the relative position of rotating component 12 during operation of rotating device 10. FIG. 3 is a block diagram of an exemplary monitoring system 14 that may be used to monitor rotating device 10.

In the exemplary embodiment, rotating device 10 is a turbine engine system. Alternatively, rotating device 10 may be a steam turbine engine, a pump, a motor, or any other system that includes a rotating component. In the exemplary embodiment, turbine engine system 10 includes an intake section 16, a compressor section 18 coupled downstream from intake section 16, a combustor section 20 coupled downstream from compressor section 18, a turbine section 22 coupled downstream from combustor section 20, and an exhaust section 24. A drive shaft 28 extends between turbine section 22 and compressor section 18 along a centerline axis 30. In addition, turbine engine system 10 also includes at least one support element, such as at least one bearing 32, for supporting drive shaft 28. Combustor section 20 includes a plurality of combustors 34. Combustor section 20 is coupled to compressor section 18 such that each combustor 34 is in flow communication with compressor section 18.

A fuel assembly 36 is coupled to each combustor 34 to provide a flow of fuel to combustor 34. Turbine section 22 is rotatably coupled to compressor section 18 and to an electrical generator 38 with drive shaft 28 to impart a power loading to generator 38 during operation of turbine engine system 10. Generator 38 is coupled to a power source, such as for example, an electric utility grid (not shown) for distributing electrical power to the utility grid. Alternatively, rotating device 10 may have other configurations and use other types of components. For example, rotating device 10 may include multiple gas turbine engines, other types of turbines, and/or other types of power generation equipment.

In the exemplary embodiment, monitoring system 14 includes a computing device 40 that is coupled in communication with a plurality of sensors 42. Each sensor 42 detects various parameters relative to the operation of and environmental conditions of turbine engine system 10. Sensors 42 may include, but are not limited to only including, vibration sensors, position sensors, temperature sensors, acceleration sensors, speed sensors, fluid pressure sensors, power load sensors, and/or any other sensors that sense various parameters relative to the operation of turbine engine system 10. As used herein, the term "parameters" refers to physical properties whose values can be used to define the operating and environmental conditions of turbine engine system 10, such as temperatures, fluid pressures, electric power loading, vibrations, rotational speed, and fluid flows at defined locations.

In the exemplary embodiment, monitoring system 14 includes at least one proximity sensor 44 that is positioned near or adjacent to a component 12 of turbine engine system 10, such as for example, compressor section 18, turbine section 22, and/or drive shaft 28 for sensing a vibration and/or a position of component 12. Proximity sensor 44 is communicatively coupled to computing device 40 and is configured to sense a position of component 12 with respect to proximity sensor 44 and transmit the sensed position to computing device 40. In one embodiment, proximity sensor 44 is positioned adjacent drive shaft 28, and near or adjacent bearing 32 for sensing a vibration and/or position of drive shaft 28 with respect to bearing 32. In another embodiment, proximity sensor 44 produces eddy currents to generate a signal indicative of a position and/or vibration of component 12. Moreover, proximity sensor 44 produces eddy currents to generate a signal indicative of a gap 46 or space between rotating machinery component 12, such as a gap or space between drive shaft 28 and proximity sensor 44.

In the exemplary embodiment, three perpendicular axes X, Y, and Z are used to define a three-dimensional Cartesian coordinate system relative to drive shaft 28. Specifically, the Z-axis is oriented to extend substantially coaxially through a centerpoint 48 of component 12, and the X-axis and the Y-axis intersect to form a reference plane 50 within turbine engine system 10. Monitoring system 14, in the exemplary embodiment, includes a first proximity sensor 52 that is positioned adjacent to component 12 along the Y-axis for use in sensing a position of component 12 with respect to the Y-axis and for transmitting the sensed position to computing device 40. Monitoring system 14 also includes a second proximity sensor 54 that is positioned along the X-axis and adjacent to component 12 for use in sensing a position of component 12 with respect to the X-axis and for transmitting a signal indicative of the sensed position to computing device 40.

In addition, in the exemplary embodiment, monitoring system 14 includes at least one speed sensor 56 for use in sensing a rotational speed and/or a rotational frequency of component 12 and for transmitting a signal indicative of the sensed rotational speed and/or the sensed rotational frequency to computing device 40. More specifically, each speed sensor 56 detects a predefined mark, or indicia such as a magnetic strip or different material from component 12, or a notch (not shown) on component 12 during each revolution of component 12 as the mark or notch rotates past speed sensor 56. There could be other incremental rotational/time indicia ±90°, ±180°, et. In the exemplary embodiment, speed sensor 56 transmits signals representative of the detection of the mark or notch to computing device 40 for use in calculating or determining a rotational frequency of component 12.

In the exemplary embodiment, computing device 40 includes a processor 58 coupled in communication with a memory device 60 for executing programmed instructions. In some embodiments, executable instructions are stored in memory device 60. Alternatively, executable instructions may be retrieved from another device via a computer network. In the exemplary embodiment, computing device 40 is programmable to perform one or more operations described herein by programming processor 58. For example, processor 58 may be programmed by encoding an operation as one or more executable instructions and providing the executable instructions in memory device 60. Processor 58 may include one or more processing units (e.g., in a multi-core configuration).

Processor 58 may include, but is not limited to including, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a non-transitory computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

In the exemplary embodiment, memory device 60 is one or more devices that enable information, such as executable instructions and/or other data, to be selectively stored and retrieved. Memory device 60 may include one or more computer readable media, such as, without limitation, dynamic random access memory (DRAM), static random access memory (SRAM), a solid state disk, and/or a hard disk. Memory device 60 may be configured to store, without limitation, executable instructions and/or any other type of data suitable for use with the methods described herein.

In the exemplary embodiment, computing device 40 includes a presentation interface 62 that is coupled to processor 58. Presentation interface 62 is configured to output (e.g., display, print, and/or otherwise output) information, such as, but not limited to, a plurality of traces corresponding to a sensed vibration amplitude of component 12, to a user 64. For example, presentation interface 62 may include a display adapter (not shown) that is coupled to a display device, such as a cathode ray tube (CRT), a liquid crystal display (LCD), an organic LED (OLED) display, and/or an "electronic ink" display. In some embodiments, presentation interface 62 includes more than one display device.

Computing device 40 also includes an input interface 66 that receives input from user 64. Input interface 66 may be configured to receive a selection or entry of configuration data (e.g., a scaled factor to increase or reduce the magnification of the trace presented on the display), and/or any other information suitable for use with the methods and systems described herein.

In the exemplary embodiment, input interface 66 is coupled to processor 58 and may include, for example, a keyboard, a pointing device, a mouse, a stylus, a touch sensitive panel (e.g., a touch pad or a touch screen), a gyroscope, an accelerometer, a position detector, a toggle switch, a selector dial, and/or an audio input interface. A single component, such as a touch screen, may function as both a display device of presentation interface 62 and as input interface 66.

In addition, computing device 40 includes a sensor interface 68 that is coupled to at least one sensor 42. Each sensor 42 transmits a signal corresponding to a sensed operating parameter of component 12. Each sensor 42 may transmit a signal continuously, periodically, or only once and/or any other signal timing that enables computing device 40 to function as described herein. Moreover, each sensor 42 may transmit a signal either in an analog form or in a digital form.

Computing device 40 may include a communication interface 70 coupled to processor 58. Communication interface 70 is coupled in communication with a remote device, such as another computing device 40. For example, communication interface 70 may include, without limitation, a wired network adapter, a wireless network adapter, and/or a mobile telecommunications adapter. Any other device may be considered remote to computing device 40. For example, any other computing device 40 with which computing device 40 communicates via communication interface 70 (e.g., as opposed to communicating via a shared memory device 60) may be considered remote. Alternatively, a device may be considered remote if it is positioned at more than a predetermined distance from computing device 40. The predetermined distance may be expressed, for example, in terms of geography (e.g., 10 meters, 100 meters, or 1 kilometer) and/or network topology (e.g., 1 network link, 2 network links, or 5 network links apart).

In the exemplary embodiment, computing device 40 stores in memory device 60, and/or is operable to access via communication interface 70 (e.g., from another computing device 40), data for use in calculating a vibration amplitude of component 12 and/or displaying a trace corresponding to a calculated component vibration.

During operation, intake section 16 channels air towards compressor section 18. Compressor section 18 compresses the inlet air to a higher pressure and temperature, and discharges the compressed air towards combustor section 20. Fuel is channeled from fuel assembly 36 to each combustor 34 wherein the fuel is mixed with the compressed air and ignited in combustor section 20. Combustor section 20 channels combustion gases to turbine section 22 wherein thermal energy is converted to mechanical rotational energy to drive compressor section 18 and/or generator 38. Exhaust gases exit turbine section 22 and flow through exhaust section 24 to ambient atmosphere. Proximity sensors 52 and 54 sense a position and/or vibration of component 12 with respect to reference plane 50, and transmit a signal indicative of the sensed position and/or vibration to computing device 40. Computing device 40 calculates a plurality of timebased position values that include a position of component 12 along a predefined axis with respect to a predefined period of time. More specifically, computing device 40 calculates a plurality of first timebased position values that include a position of component 12 along the Y-axis with respect to a predefined period of time. In addition, computing device 40 calculates a plurality of second timebased position values that include a position of component 12 along the X-axis with respect to a predefined period of time. Moreover, computing device 40 calculates a plurality of orbital position values that include a position of component centerpoint 48 within reference plane 50.

Computing device 40, in the exemplary embodiment, graphically presents, via presentation interface 62, a plurality of timebased traces that correspond to the calculated timebased position values. In addition, computing device 40 graphically presents a plurality of orbit traces that correspond to the calculated orbital position values. In the exemplary embodiment, computing device 40 selectively presents the plurality of timebased traces and/or the plurality of orbit traces in response to a user selection input to computing device 40.

Figure 4:
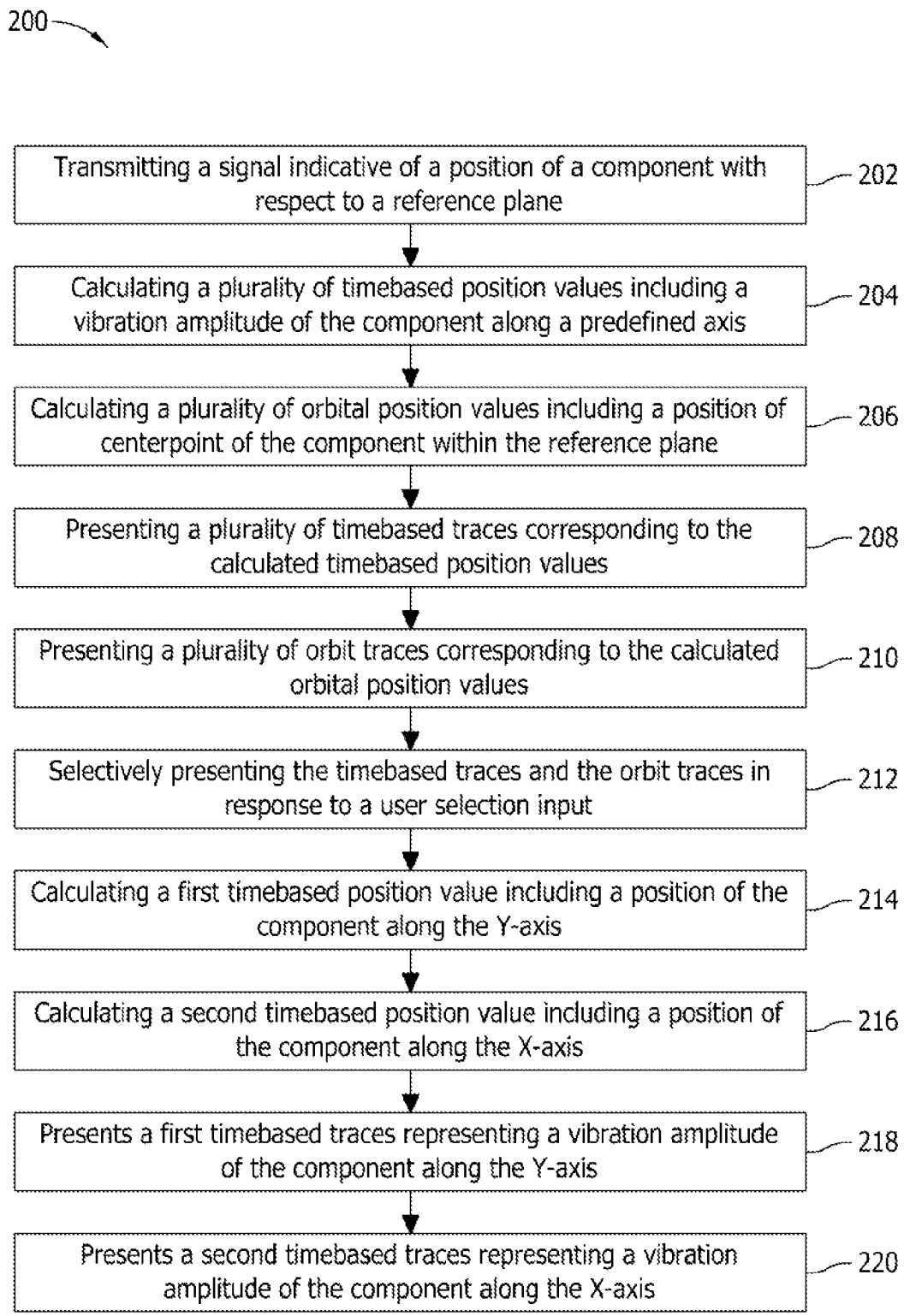
FIG. 4 is a flowchart of an exemplary method that may be used in monitoring operation of the rotating device shown in FIG. 1.
Figure 5:
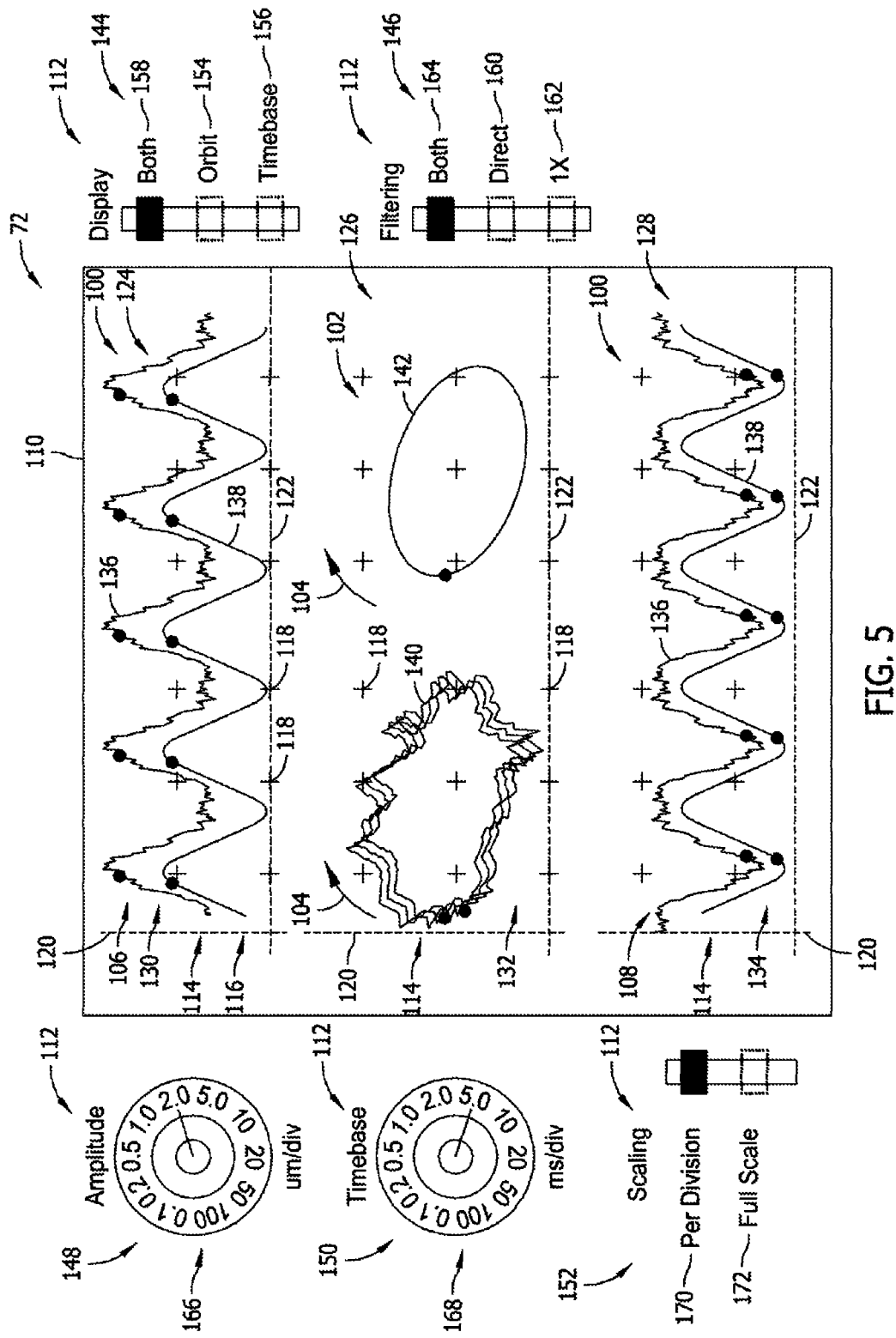
FIG. 5 is an exemplary graphical interface that may be used with the method shown in FIG. 4.

FIG. 4 is a flowchart of an exemplary method 200 that may be used in monitoring an operation of rotating device 10 (shown in FIG. 1). Portions of method 200 may be performed by any one of, or any combination of, computing devices 40 (shown in FIGS. 1 and 2). FIG. 5 is an exemplary graphical interface 72 that may be used to monitor an operation of rotating device 10. In the exemplary embodiment, graphical interface 72 is presented by computing device 40 (e.g., via presentation interface 62, shown in FIG. 2) and may receive input (e.g., selections and/or entries) via input interface 66 (shown in FIG. 2). In one embodiment, one or more of the selections described herein are received via communication interface 70 (shown in FIG. 2). For example, a selection may be received via input interface 66 of remote computing device 40 and may be transmitted by a communication interface 70 of remote computing device 40.

In the exemplary embodiment, method 200 includes transmitting 202, from proximity sensor 44 to computing device 40, a signal indicative of a position of component 12 with respect to reference plane 50. Computing device 40 calculates 204 a plurality of timebased position values, including a vibration amplitude of component 12 along a predefined axis with respect to a predefined period of time, based at least in part on the received signal. Computing device 40 also calculates 206 a plurality of orbital position values including a position of centerpoint 48 of component 12 within reference plane 50. In the exemplary embodiment, computing device 40 presents 208 a plurality of timebased traces 100 that correspond to the calculated timebased position values and that represent a vibration amplitude of component 12 along a predefined axis. In addition, computing device 40 presents 210 a plurality of orbit traces 102 that correspond to the calculated orbital position values and that represent a position of centerpoint 48 within reference plane 50 along the X-axis and the Y-axis. Moreover, computing device 40 selectively presents 212 timebased traces 100, orbit traces 102, or both timebased and orbit traces 100 and 102, in response to a user selection input to computing device 40. In one embodiment, computing device 40 displays an arrow 104, adjacent to orbit traces 102, that is indicative of a rotational direction of component 12.

Method 200 also includes calculating 214 a first plurality of timebased position values, including a position of component 12 along the Y-axis, and calculating 216 a second plurality of timebased position values, including a position of component 12 along the X-axis. In addition, computing device 40 presents 218 a first plurality of timebased traces 106 that correspond to the calculated first plurality of timebased position values and that represent a vibration amplitude of component 12 along the Y-axis with respect to a predefined period of time. Moreover, computing device 40 presents 220 a second plurality of timebased traces 108 that correspond to the calculated second plurality of timebased position values and that represent a vibration amplitude of component 12 along the X-axis with respect to a predefined period of time.

In the exemplary embodiment, computing device 40 presents graphical interface 72 with a data display 110 and a plurality of selectors 112. Each selector 112 is configured to receive a user selection input to enable timebased and orbit traces 100 and 102 presented within data display 110 to be variably selected and adjusted. In addition, data display 110 includes a plurality of data sections 114 that display timebased and orbit traces 100 and 102. Each data section 114 includes a graphical scale 116 that is segmented into a plurality of divisions 118 oriented along a vertical axis 120 and along a horizontal axis 122.

In the exemplary embodiment, data display 110 includes a first data section 124, a second data section 126, and a third data section 128. First data section 124 presents first timebased traces 106 with respect to a first graphical scale 130 that displays component vibration amplitude with respect to the Y-axis along vertical axis 120, and displays time along horizontal axis 122. Second data section 126 presents orbit traces 102 and includes a second graphical scale 132 that displays component vibration amplitude with respect to the Y-axis along vertical axis 120, and displays component vibration amplitude with respect to the X-axis along horizontal axis 122. Third data section 128 presents second timebased traces 108 with respect to a third graphical scale 134 that displays component vibration amplitude with respect to the X-axis along vertical axis 120, and displays time along horizontal axis 122. In the exemplary embodiment, second data section 126 is between first data section 124 and third data section 128, along vertical axis 120, such that orbit traces 102 are displayed between the first timebased traces 106 and the second timebased traces 108. In addition, in the exemplary embodiment, the scaled units of first graphical scale 130 are approximately equal to the scaled units of second graphical scale 132 and of third graphical scale 134 such that first timebased traces 106 correspond to second timebased traces 108 and to orbit traces 102 to enable a user visually comparing first and second timebased traces 106 and 108 and orbit traces 102 to monitor component 12.

In the exemplary embodiment, method 200 includes calculating the timebased and orbital position values including a plurality of predefined scaled amplitude factors. Computing device 40 selectively presents timebased and orbit traces 100 and 102 that correspond to a predefined scaled amplitude factor in response to a user selection input. In addition, computing device 40 selectively presents timebased and orbit traces 100 and 102 that correspond to scaled amplitude factors, such as multiples of 1, 2, 5, and 10× amplitude.

Method 200 also includes calculating timebased position values including a plurality of predefined scaled time periods. Computing device 40 selectively presents first and second timebased traces 106 and 108 that correspond to a predefined scaled time period in response to a user selection input. Moreover, computing device 40 selectively presents first and second timebased traces 106 and 108 that correspond to scaled time period multiples of 1, 2, 5, and 10× the period of time.

In the exemplary embodiment, each division 118 corresponds to a predefined measurement unit such as, a unit of vibration amplitude and/or a unit of time. Computing device 40 adjusts a size and shape of timebased and orbit traces 100 and 102 by selectively adjusting an amount of measurement units defined by each division 118 in response to a user selection input. In addition, each axis 120 and 122 within graphical scale 116 includes a predefined amount of measurement units. Computing device 40 also adjusts a size and shape of timebased and orbit traces 100 and 102 by selectively adjusting an amount of measurement units defined by each axis 120 and 122 in response to a user selection input.

In the exemplary embodiment, method 200 also includes transmitting, from speed sensor 56 to computing device 40, a signal indicative of a rotational frequency of rotating device 10 and/or component 12. Computing device 40 calculates a plurality of filtered timebased position values based at least in part the sensed rotational frequency. In addition, computing device 40 calculates a plurality of filtered orbital position values based on the sensed rotational frequency. More specifically, computing device 40 calculates filtered timebased and orbital position values using a bandpass filter (not shown) with a center frequency about, for example, a sensed rotational frequency of component 12. As such, in the exemplary embodiment, the filter removes undesired frequency components from the signals received from sensors 52 and 54 such that the amplitude of the vibration of each component 12 may be isolated and/or may be more easily viewed. Alternatively, the filter may be a low-pass filter, a high-pass filter, or any other filter that enables monitoring system 14 to function as described herein.

In the exemplary embodiment, computing device 40 selectively presents a plurality of direct timebased traces 136 that correspond to unfiltered timebased position values, and a plurality of filtered timebased traces 138 that correspond to the calculated filtered timebased position values. Similarly, computing device 40 selectively presents a plurality of direct orbit traces 140 that correspond to unfiltered orbital position values, and a plurality of filtered orbit traces 142 that correspond to the calculated filtered orbital position values. In the exemplary embodiment, computing device 40 selectively presents filtered timebased traces 138 and/or direct timebased traces 136 in response to a user selection input. In addition, computing device 40 presents filtered timebased traces 138 adjacent to direct timebased traces 136 along vertical axis 120. Computing device 40 also selectively presents filtered orbit traces 142 and/or direct orbit traces 140 in response to a user selection input. Moreover, computing device 40 presents direct orbit traces 140 adjacent filtered orbit traces 142 along horizontal axis 122.

In the exemplary embodiment, graphical interface 72 includes a trace display selector 144, a filtering selector 146, an amplitude factor selector 148, a timebased factor selector 150, and a scaling selector 152. Trace display selector 144 is configured to enable a user to select the traces to be displayed within data display 110. Trace display selector 144 includes an orbit trace selection 154, a timebased selection 156, and an orbit/timebased (OTB) trace selection 158. Computing device 40 selectively presents timebased traces 100 and/or orbit traces 102 in response to a user selection input corresponding to orbit trace selection 154, timebased selection 156, or OTB trace selection 158. In the exemplary embodiment, computing device 40 presents orbit traces 102 in response to a user selection of orbit trace selection 154. Moreover, computing device 40 presents timebased traces 100 in response to a selection of timebased selection 156, and presents both timebased and orbit traces 100 and 102 in response to a selection of OTB trace selection 158.

Filtering selector 146 is configured to enable a user to selectively present direct timebased and orbit traces 136 and 140 and/or filtered timebased and orbit traces 138 and 142. Filtering selector 146 includes a direct trace selection 160, a filtered trace selection 162, and a direct/filtered trace selection 164. Computing device 40 presents direct timebased and orbit traces 136 and 140 in response to a user selection of direct trace selection 160, and presents filtered timebased and orbit traces 138 and 142 in response to a user selection of filtered trace selection 162. In addition, computing device 40 presents both direct timebased and orbit traces 136 and 140 and filtered timebased and orbit traces 138 and 142 in response to a user selection of direct/filtered trace selection 164.

Amplitude factor selector 148 enables a user to adjust a size and shape of timebased and orbit traces 100 and 102 by adjusting a unit of measurement defined by graphical scale 116 or by each division 118. Amplitude factor selector 148 includes a plurality of amplitude factors 166 corresponding to a unit of amplitude defined by graphical scale 116 or by each division 118. Computing device 40 presents timebased and orbit traces 100 and 102 that correspond to the selected amplitude factor. In the exemplary embodiment, amplitude factor selector 148 includes amplitude factors including multiples of 1, 2, 5, and 10 times the scaled unit. Alternatively, amplitude factor selector 148 may include any suitable number of scaling factors to enable monitoring system 14 to function as described herein.

Timebased factor selector 150 enables a user to adjust a size and shape of timebased traces 100 by adjusting a time period defined by graphical scale 116 or by each division 118. Timebased factor selector 150 includes a plurality of time period scaling factors 168 including multiples of 1, 2, 5, and 10 times the scaled unit. Alternatively, timebased factor selector 150 may include any suitable number of scaling factors to enable monitoring system 14 to function as described herein. In the exemplary embodiment, computing device 40 selectively presents timebased traces 100 corresponding to a selected time period amplitude factor by adjusting the time period defined by graphical scale 116 or by each division 118 to correspond to the selected time period scaling factor.

Scaling selector 152 enables a user to adjust a scale defined by graphical scale 116 or each division 118. Scaling selector 152 includes a per division selection 170 and a full scale selection 172. Computing device 40 adjusts an amount of measurement units defined by each division 118 in response to a user selection of per division selection 170. More specifically, after selecting per division selection 170, amplitude factors 166 and time period scaling factors 168 adjust the amount of measurement units defined by each division 118. Moreover, after selecting full scale selection 172, amplitude factors 166 and time period scaling factors 168 adjust the total number of measuring units defined by graphical scale 116.

The orientation and position of timebased and orbit traces 100 and 102 within data display 110 is selected to enable a user to correlate sensed vibration amplitudes of component 12 along the X-axis and the Y-axis to quickly and efficiently identify undesired vibration amplitudes within component 12. In addition, monitoring system 14 enables a user to adjust the size and shape of timebased and orbit traces 100 and 102 by adjusting the amplitude and time period of the timebased and orbit traces 100 and 102. By selectively presenting timebased and orbit traces 100 and 102, monitoring system enables a user to identify undesired vibration amplitudes such that the user may take correcting action to reduce an occurrence of damage to component 12 and/or rotating device 10.

The above-described systems and methods overcome at least some disadvantages of known diagnostic platforms by providing a monitoring system that enables a plurality of traces that correspond to a sensed vibration amplitude of a rotating component within a reference plane to be selectively presented. Moreover, the embodiments described herein provide a monitoring system that senses a position of a rotating component along an X-axis and a Y-axis and graphically presents a plurality of traces corresponding to the sensed vibration amplitude within the Cartesian coordinate system. In addition, the monitoring system enables a user to selectively adjust a size and shape of the traces by selecting from a plurality of scale factors to adjust the scaled amplitude and scaled time periods corresponding with the displayed traces. By displaying a plurality of traces that correspond to a vibration amplitude of a rotating component, the monitoring system described herein, enables a user to quickly and efficiently identify undesired vibration amplitudes as compared to known diagnosis systems, thus, increasing the operating efficiency of the rotating component.

An exemplary technical effect of the methods, system, and apparatus described herein includes at least one of: (a) transmitting, from at least one sensor, one or more signals indicative of a relative position of a component coupled to the rotating device with respect to a reference; (b) calculating a plurality of timebased position values associated with a relative position of the component with respect to a predefined period of time; (c) calculating a plurality of orbital position values including a position of the component within the reference plane; and (d) presenting at least one of a plurality of timebased traces corresponding to the calculated timebased position values and a plurality of orbit traces corresponding to the calculated orbital position values.

Exemplary embodiments of a monitoring system and methods for use in monitoring operation of a rotating device are described above in detail. The systems and methods are not limited to the specific embodiments described herein, but rather, components of the systems and/or steps of the methods may be utilized independently and separately from other components and/or steps described herein. For example, the methods may also be used in combination with other rotating devices, and are not limited to practice with only the turbine engine system as described herein. Rather, the exemplary embodiment can be implemented and utilized in connection with many other rotating system applications.

Embodiments described herein may be performed using a computer-based and/or computing-device-based operating environment as described herein. A computer or computing device may include one or more processors or processing units, system memory, and some form of non-transitory computer-readable media. Exemplary non-transitory computer-readable media include flash memory drives, hard disk drives, digital versatile discs (DVDs), compact discs (CDs), floppy disks, and tape cassettes. By way of example and not limitation, computer-readable media comprise computer storage media and communication media. Computer-readable storage media are non-transitory and store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Aspects of the invention transform a general-purpose computer into a special-purpose computing device when configured to execute the instructions described herein. Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention may be practiced with modification within the spirit and scope of the claims.

What is claimed is:

1. A system for use in monitoring the operation of a rotating device, the system comprising:
    at least one sensor configured to sense a position of a component coupled to the rotating device, and to generate at least one signal indicative of the position of the component with respect to a geometrical reference;
    an input device configured to generate a signal indicative of a user selection input;
    a display device; and
    a processor coupled in communication with the at least one sensor, the input device, and the display device, wherein the processor is programmed to:
        calculate a plurality of timebased position values associated with at least one position of the component with respect to a predefined period of time;
        calculate a plurality of orbital position values associated with a relative position of the component; and
        graphically present at least one of a plurality of timebased traces corresponding to the calculated plurality of timebased position values and a plurality of orbit traces corresponding to the calculated plurality of orbital position values in response to at least one user selection input via the input device.

2. The system of claim 1, wherein the processor is programmed to:
    present the plurality of timebased traces and the plurality of orbit traces with respect to a graphical scale including a predefined amount of units of measurement; and
    adjust the amount of units of measurement within the graphical scale in response to a user selection to selectively adjust a shape of the timebased traces and of the orbit traces.

3. The system of claim 1, comprising:
    a first sensor configured to sense a first position of the component along a Y-axis; and
    a second sensor configured to sense a second position of the component along an X-axis.

4. The system of claim 3, wherein the processor is programmed to:
    calculate a first plurality of timebased position values including a first relative position of the component along the Y-axis with respect to the predefined period of time;
    calculate a second plurality of timebased position values including a second relative position of the component along the X-axis with respect to the predefined period of time; and
    graphically present a first timebased trace corresponding to the calculated first plurality of timebased position values and a second timebased trace corresponding to the calculated second plurality of timebased position values.

5. The system of claim 1, wherein the processor is programmed to:
    calculate the plurality of timebased position values and the plurality of orbital position values at a plurality of predefined scaled amplitude factors; and
    selectively present the timebased and orbit traces corresponding to a predefined scaled amplitude factor in response to a first user selection.

6. The system of claim 5, wherein the processor is programmed to:
    calculate the plurality of timebased position values including a plurality of predefined time periods; and
    selectively present the timebased trace corresponding to the calculated timebased position values at a predefined time period in response to a second user selection.

7. The system of claim 1, comprising a second sensor configured to sense a rotational frequency of the rotating device and to generate a signal indicative of the sensed rotational frequency, wherein the processor is coupled in communication with the second sensor, the processor is programmed to:
    calculate a filtered timebased positional value based at least in part on the received signal; and
    present a filtered timebased trace corresponding to the calculated filtered timebased positional value in response to a user selection.

8. The system of claim 1, wherein the geometrical reference comprises a reference plane.

9. One or more non-transitory computer-readable storage media having computer executable instructions embodied thereon, wherein when executed by at least one processor, the computer-executable instructions cause the at least one processor to:
    receive a signal indicative of a position of a component coupled to a rotating device with respect to a geometrical reference;
    calculate a plurality of timebased position values associated with at least one position of the component with respect to a predefined period of time;
    calculate a plurality of orbital position values associated with a relative position of the component; and
    graphically present at least one of a plurality of timebased traces corresponding to the calculated plurality of timebased position values and a plurality of orbit traces corresponding to the calculated plurality of orbital position values in response to a user selection input via an input device.

10. The media of claim 9, wherein when executed by at least one processor, the computer-executable instructions cause the at least one processor to:
present the plurality of timebased traces and the plurality of orbit traces with respect to a graphical scale including plurality of divisions; and
selectively present the plurality of timebased and orbit traces corresponding to a predefined scaled division factor in response to at least one user selection.

11. The media of claim 9, wherein when executed by at least one processor, the computer-executable instructions cause the at least one processor to:
calculate a first plurality of timebased position values including a first relative position of the component along a Y-axis with respect to the predefined period of time;
calculate a second plurality of timebased position values including a second relative position of the component along an X-axis with respect to the predefined period of time; and
graphically present a first timebased trace corresponding to the calculated first plurality of timebased position values and a second timebased trace corresponding to the calculated second plurality of timebased position values.

12. The media of claim 9, wherein when executed by at least one processor, the computer-executable instructions cause the at least one processor to:
calculate the plurality of timebased position values and the plurality of orbital position values at a plurality of predefined scaled amplitude factors; and
selectively present the plurality of timebased traces and the plurality of orbit traces corresponding to a predefined scaled amplitude factor in response to at least one user selection.

13. The media of claim 9, wherein when executed by at least one processor, the computer-executable instructions cause the at least one processor to:
receive a second signal indicative of a rotational frequency of the rotating device;
calculate a filtered timebased positional value based at least in part on the received second signal;
present a filtered timebased trace corresponding to the calculated filtered timebased positional value in response to at least one user selection input.

14. The media of claim 9, wherein the geometrical reference comprises a reference plane.

15. A method of monitoring the operation of a rotating device, the method comprising:
transmitting, from at least one sensor, one or more signals indicative of a position of a component coupled to the rotating device with respect to a geometrical reference;
calculating, via one or more processors, a plurality of timebased position values associated with at least one position of the component with respect to a predefined period of time;
calculating, via the one or more processors, a plurality of orbital position values including a relative position of the component within a reference plane; and
presenting, via at least one display device, at least one of a plurality of timebased traces corresponding to the calculated timebased position values and a plurality of orbit traces corresponding to the calculated orbital position values.

16. The method of claim 15, comprising selectively presenting, via the at least one display device, at least one of the plurality of timebased traces and the plurality of orbit traces in response to at least one user selection.

17. The method of claim 15, comprising:
presenting, via the at least one display device, the plurality of timebased traces and the plurality of orbit traces with respect to a graphical scale including a predefined amount of units of measurement; and
adjusting the amount of units of measurement within the graphical scale in response to at least one user selection input to selectively adjust a shape of the timebased traces and of the orbit traces.

18. The method of claim 17, comprising:
presenting, via the at least one display device, the plurality of timebased traces and the plurality of orbit traces with respect to the graphical scale including a plurality of divisions, wherein each division of the plurality of divisions defines a unit of measurement; and
adjusting the amount of units of measurement defined by each division of the plurality of divisions in response to at least one user selection.

19. The method of claim 15, comprising:
calculating, via the one or more processors, a first plurality of timebased position values including a first relative position of the component along a Y-axis with respect to the predefined period of time;
calculating, via the one or more processors, a second plurality of timebased position values including a second relative position of the component along an X-axis with respect to the predefined period of time; and
presenting, via the at least one display device, a first timebased trace corresponding to the calculated first timebased position values and a second timebased trace corresponding to the calculated second timebased position values.

20. The method of claim 15, comprising:
calculating, via the one or more processors, the plurality of timebased position values and the plurality of orbital position values at a plurality of predefined scaled amplitude factors; and
presenting, via the at least one display device, the plurality of timebased traces and the plurality of orbit traces corresponding to a predefined scaled amplitude factor in response to at least one user selection.

21. The method of claim 15, comprising:
calculating, via the one or more processors, the plurality of timebased position values including a plurality of predefined time periods; and
presenting, via the at least one display device, the plurality of timebased traces corresponding to the calculated timebased position values at a predefined time period in response to at least one user selection.

22. The method of claim 15, comprising:
transmitting a signal indicative of a rotational frequency of the rotating device;
calculating, via the one or more processors, a filtered timebased positional value based at least in part on the received signal;
presenting, via the at least one display device, a filtered timebased trace corresponding to the calculated filtered timebased positional value in response to at least one user selection.

23. The method of claim 15, wherein the geometrical reference comprises the reference plane.

* * * * *